United States Patent
Choi et al.

(10) Patent No.: US 9,610,905 B2
(45) Date of Patent: Apr. 4, 2017

(54) RADIO FREQUENCY CONNECTOR ASSEMBLY FOR VEHICLE

(71) Applicants: HYUNDAI MOTOR COMPANY, Seoul (KR); INFAC Elecs Co., Ltd., Incheon (KR)

(72) Inventors: Young Jin Choi, Yongin-si (KR); Jin Kyu Hwang, Incheon (KR); Kil Sun Hong, Incheon (KR)

(73) Assignees: HYUNDAI MOTOR COMPANY, Seoul (KR); INFAC ELECS CO., LTD., Incheon (KR)

( * ) Notice: Subject to any disclaimer, the term of this patent is extended or adjusted under 35 U.S.C. 154(b) by 175 days.

(21) Appl. No.: 14/558,612

(22) Filed: Dec. 2, 2014

(65) Prior Publication Data

US 2015/0188267 A1    Jul. 2, 2015

(30) Foreign Application Priority Data

Dec. 30, 2013 (KR) .......................... 10-2013-0167262

(51) Int. Cl.
*B60R 16/023* (2006.01)
*H01R 9/03* (2006.01)
*H01R 13/58* (2006.01)
*H01R 24/60* (2011.01)
*H01R 107/00* (2006.01)

(52) U.S. Cl.
CPC .......... *B60R 16/023* (2013.01); *H01R 9/038* (2013.01); *H01R 13/5812* (2013.01); *H01R 24/60* (2013.01); *H01R 2107/00* (2013.01)

(58) Field of Classification Search
CPC .................................................. H01R 13/648
USPC ................... 439/660, 581, 76.1, 465
See application file for complete search history.

(56) References Cited

U.S. PATENT DOCUMENTS 3,689,865 A * 9/1972 Pierini .................... H01P 5/085
                                                    439/581
3,760,335 A * 9/1973 Roberts ................ H01R 4/2462
                                                    439/398

(Continued)

FOREIGN PATENT DOCUMENTS

JP    2004-179150 A    6/2004
JP    3121187 U        4/2006

(Continued)

*Primary Examiner* — Neil Abrams
(74) *Attorney, Agent, or Firm* — McDermott Will & Emery LLP

(57) ABSTRACT

A radio frequency (RF) connector assembly for a vehicle includes a male connector and a female connector to which a plurality of cables are assembled, respectively. A female housing of the female connector is inserted into a male housing of the male connector to be coupled to each other. Simultaneously, a female terminal module provided in the female connector for a signal transmission of the cables and a male terminal block provided in the male connector for the signal transmission of the cables contact each other to transmit signals. The male connector may include a board with signal pins on one side and a ground plane on the other side and may also include a cover with a plurality of pressurizing protrusions to downwardly press the cables whereby terminals of the cables may stably contact each of a plurality of male signal pins thereunder.

5 Claims, 4 Drawing Sheets

(56) References Cited

U.S. PATENT DOCUMENTS

| | | | |
|---|---|---|---|
| 3,892,464 A * | 7/1975 | Griffin | H01R 13/28 439/676 |
| 4,026,625 A * | 5/1977 | Roiko | H01R 13/28 439/405 |
| 4,295,696 A * | 10/1981 | Gray | H01R 13/5812 439/470 |
| 4,871,319 A * | 10/1989 | Babow | H01R 12/62 439/493 |
| 5,017,156 A * | 5/1991 | Sugiyama | H01R 13/65802 439/607.32 |
| 5,224,867 A * | 7/1993 | Ohtsuki | H01R 23/688 439/108 |
| 5,364,292 A * | 11/1994 | Bethurum | H01R 13/6599 439/607.02 |
| 5,679,008 A * | 10/1997 | Takahashi | H01R 9/0515 439/497 |
| 5,810,620 A * | 9/1998 | Kobayashi | A61B 1/00114 392/379 |
| 5,860,832 A * | 1/1999 | Wayt | H01R 23/661 439/465 |
| 5,959,253 A * | 9/1999 | Shinchi | H01R 4/029 174/88 R |
| 6,165,012 A * | 12/2000 | Abe | H01R 13/432 439/465 |
| 6,203,333 B1 * | 3/2001 | Medina | H01R 13/6658 439/465 |
| 6,524,135 B1 * | 2/2003 | Feldman | H01R 9/035 439/607.46 |
| 6,619,987 B2 * | 9/2003 | Kumamoto | H01R 9/032 439/521 |
| 6,863,549 B2 * | 3/2005 | Brunker | H01R 13/6477 439/108 |
| 6,939,174 B2 * | 9/2005 | Wu | H01R 13/514 439/607.05 |
| 7,104,834 B2 * | 9/2006 | Robinson | A61B 18/14 439/495 |
| RE39,380 E * | 11/2006 | Davis | 439/108 |
| 7,131,862 B2 * | 11/2006 | Vermeersch | H01R 13/6658 439/497 |
| 7,144,256 B2 * | 12/2006 | Pabst | H01R 12/88 439/67 |
| 7,354,306 B2 * | 4/2008 | Thorner | H01R 24/20 439/578 |
| 7,607,944 B2 * | 10/2009 | Yoshioka | H01R 12/598 439/579 |
| 8,308,515 B2 * | 11/2012 | Chang | H01R 12/73 439/660 |
| 8,360,805 B2 * | 1/2013 | Schwarz | H01R 13/514 439/578 |
| 8,986,049 B2 * | 3/2015 | Kamarauskas | H01R 13/2442 439/607.41 |
| 9,306,334 B2 * | 4/2016 | Zhu | H05K 1/0219 |
| 9,373,915 B1 * | 6/2016 | Schulz | H01R 13/6594 |
| 9,466,925 B2 * | 10/2016 | Rost | H01R 9/032 |
| 2008/0026612 A1 | 1/2008 | Malstrom et al. | |
| 2011/0237122 A1 | 9/2011 | Schwarz | |

FOREIGN PATENT DOCUMENTS

| | | |
|---|---|---|
| JP | 2012-151365 A | 8/2012 |
| KR | 10-2010-0040085 A | 4/2010 |
| KR | 10-2011-0064173 A | 6/2011 |
| KR | 10-2012-0132343 A | 12/2012 |

* cited by examiner

RADIO FREQUENCY CONNECTOR ASSEMBLY FOR VEHICLE

CROSS-REFERENCE TO RELATED APPLICATION

This application claims under 35 U.S.C. §119(a) the benefit of priority to Korean Patent Application No. 10-2013-0167262 filed on Dec. 30, 2013, the entire contents of which are incorporated herein by reference.

TECHNICAL FIELD

The present disclosure relates to a radio frequency (RF) connector assembly for a vehicle. More particularly, the present disclosure relates to an RF connector assembly that can simultaneously connect a plurality of cables for the transmission of a microwave signal.

BACKGROUND

Generally, an audiovisual (AV) system of a vehicle refers to a system including video and audio systems inside the vehicle, which enables watching TV and videos through a monitor and listening to radio in the vehicle.

The AV system uses a vehicle antenna to receive image and sound signals from the outside. Since the signals received through the antenna are high frequency microwave signals, a radio frequency (RF) connector is used for the transmission of the signals.

In a related art, an RF connector, in which one cable is coaxially inserted and assembled, and interconnected cables are connected through a coaxial contact method, is used.

In this RF connector, a cable at an AV system side and a cable at an antenna side are connected one-to-one. Accordingly, for the use of a plurality of cables for the AV system in a vehicle, the cost increases because each cable needs a connector, and the layout of the cables becomes complicated. Further, the assembly stiffness for the vibration of a vehicle is weak due to individual cable contacts.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure relates to a radio frequency (RF) connector assembly for a vehicle, which includes a multi-connection structure that can simultaneously connect a plurality of cables connected to each other one-to-one for the transmission of a microwave signal.

According to an exemplary embodiment of the present disclosure, a radio frequency connector assembly for a vehicle includes a male connector and a female connector to which a plurality of cables are assembled, respectively. A female housing of the female connector is inserted into a male housing of the male connector to be coupled to each other. Simultaneously, a female terminal module provided in the female connector for a signal transmission of the cables and a male terminal block provided in the male connector for the signal transmission of the cables contact each other to transmit signals.

The male connector may include a male pressurizing cover is fixedly assembled to a rear end of a top surface of the male housing to fixedly support the cables assembled in the male housing. The male terminal block is integrally disposed at an internal front end of the male housing and includes a plurality of male signal pins disposed on one surface thereof at a certain interval and a a plurality of male ground pins disposed on another surface thereof.

The male housing may have an assembly aperture in left and right side surfaces thereof. The female housing may include a stopping protrusion disposed on left and right side surfaces thereof and coupled to the assembly aperture. Thus, the male connector is fixedly coupled to the female connector when the female housing is inserted into the male housing.

The male terminal block may have connection grooves formed at a rear side of each signal pin to connect with a cable terminal.

The male pressurizing cover may include a plurality of pressurizing protrusions formed thereunder. The pressurizing protrusions allow a cable terminal assembled in the male housing to stably contact the signal pin thereunder.

The female connector may include a female pressurizing cover is fixedly assembled to a rear end of a top surface of the female housing to fixedly support the cables assembled in the female housing. The female terminal module includes a plurality of female signal pins integrally attached to one surface of the female housing and a plurality of female ground pins integrally attached to the other surface of the female housing. The female signal pins and the female ground pins may have a bent shape at one end thereof to have an elastic structure, thus securing connection efficiency with the male terminal block.

The female ground pins may have a connection pin to connect with a cable terminal. The connection pin may be disposed in the female housing to simultaneously contact the cable terminal when assembling.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention.

Figure 1:
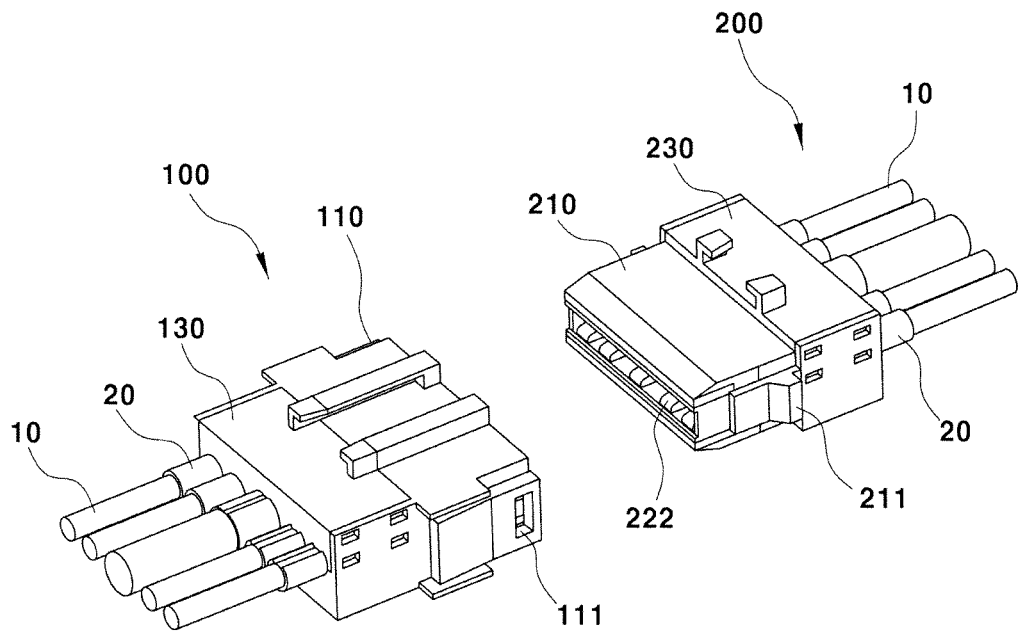
FIG. 1 is an exploded perspective view illustrating a radio frequency (RF) connector assembly according to an embodiment of the present disclosure.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general, such as passenger automobiles including sports utility vehicles (SUV), buses, trucks, various commercial vehicles; watercraft including a variety of boats and ships, aircraft, and the like, and includes hybrid vehicles; electric vehicles; plug-in hybrid electric vehicles; hydrogen-powered vehicles; and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present disclosure will be described in detail with reference to the accompanying drawings so that those skilled in the art can easily carry out the present invention.

As shown in FIG. 1, an RF connector assembly for a vehicle according to an embodiment, which includes a multi-connection structure that can simultaneously connect a plurality of cables connected to each other one-to-one for the transmission of a microwave signal, may include a male connector 100 and a female connector 200.

Figure 2:
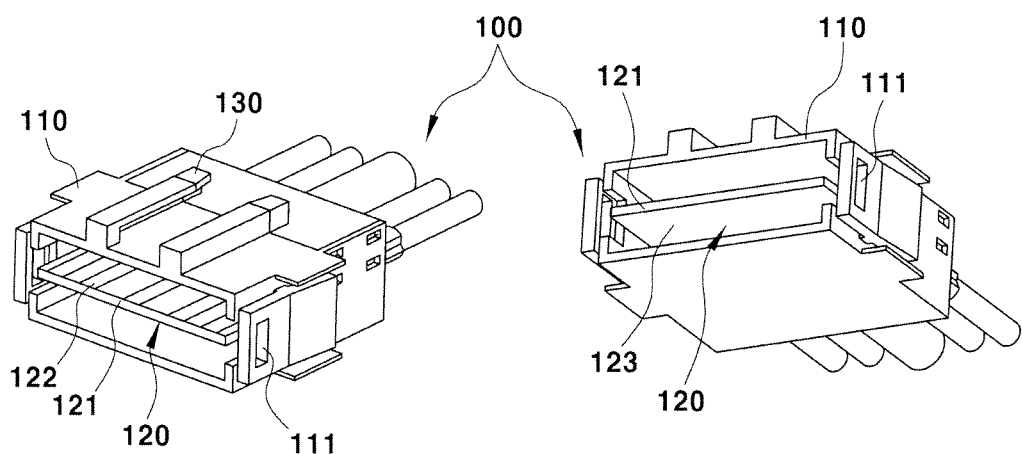
FIGS. 2 and 3 are views illustrating a male connector according to an embodiment of the present disclosure.
Figure 3:
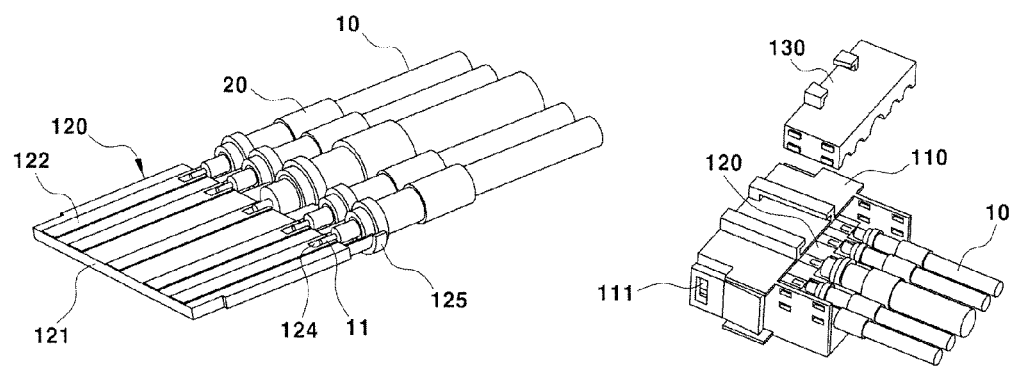

The male connector 100 may have a structure for the multi-connection using a strip line similar to a microwave transmission line. As shown in FIGS. 2 and 3, the male connector 100 may include a male housing 110 and a male terminal block 120 integrally disposed inside the male housing 110. A male pressurizing cover 130 opens/closes a rear end of the top surface of the male housing 110.

The male housing 110 may have an assembly aperture 111 formed at a front end portion of left and right side surfaces thereof to fix a female housing 210 of the female connector 200, and may include a support structure (not shown) for seating a plurality of cables 10 therein.

The support structure may be changed according to the exterior of the cables 10 that are inserted into the male housing 110 to be assembled, and may be formed to have a structure for stably supporting each cable 10.

The cables 10 may be inserted into the male housing 110 while being assembled with a plurality of clamp shells 20.

The male terminal block 120 may be for the signal transmission of the cables 10 assembled in the male housing 110, and may be fixedly disposed at an internal front side of the male housing 110. The male terminal block 120 may further include a board 121 with a certain thickness, and a plurality of male signal pins 122 and a plurality of male ground pins 123 may be disposed on the top surface and the undersurface of the board 121, respectively.

The male signal pins 122 may be formed of a material that can transmit a signal when contacting a cable terminal. For example, the male signal pins 122 may be formed of a strip conductor used in the strip line. The male signal pins 122 may be disposed in plural on the top surface of the board 121 at a certain interval to independently transmit the signals. Each of the male signal pins 122 may have a connection groove 124 that is recessed in a round shape for the connection with the cable terminal, respectively.

The male ground pins 123 may be formed of the same signal transmittable material as the male signal pins 122, and may have a planar shape along the undersurface of the board 121 to serve as the ground of the male connector 100.

The male terminal block 120 may include a support part 125 disposed at a lower end thereof to support the plurality of cables 10 coupled to the male housing 110.

The support part 125 may be integrally attached to the lower end of the male terminal block 120, and may be provided to stably support the front end of the cables 10 using the same material as the male ground pins 123.

The male pressurizing cover 130 may be fixedly disposed at the rear end of the top surface of the male housing 110 to support the cables 10 that are seated in the male housing 110. The male pressurizing cover 130 may fixedly support the cables 10 by downwardly pressurizing the cables 10, the lower side of which is supported by the internal structure of the male housing 110. Thus, the terminals of each cable 10 may be stably adhered closely to the connection groove 124 to be fixed therein.

More specifically, the terminal 11 of each cable 10 disposed in the male housing 110 may be pressurized by pressurizing protrusions 131 that downwardly protrude from the male pressurizing cover 130, stably contacting of the male signal pin 122. Particularly, the terminal 11 of the cable 10 may be inserted into the connection groove 124 of the male signal pin 122, contacting the male signal pin 122 while being stably adhered close to the male signal pin 122.

The male connector 100 may enable the signal transmission through multi-connections as described above, and may allow the plurality of cables 10 to be simultaneously connected.

Figure 4:
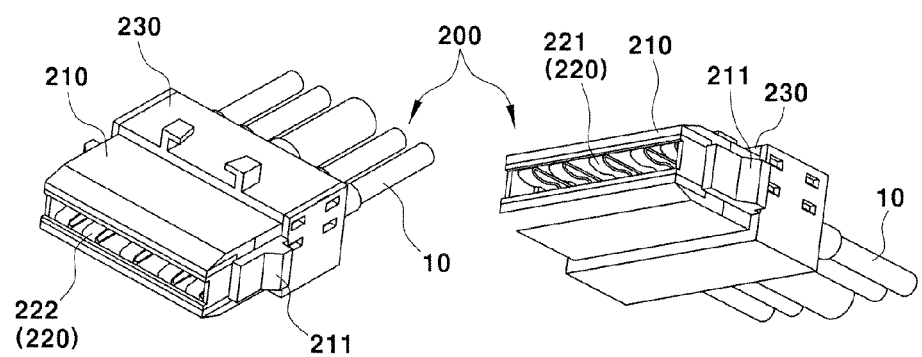
FIGS. 4 and 5 are views illustrating a female connector according to an embodiment of the present disclosure.
Figure 5:
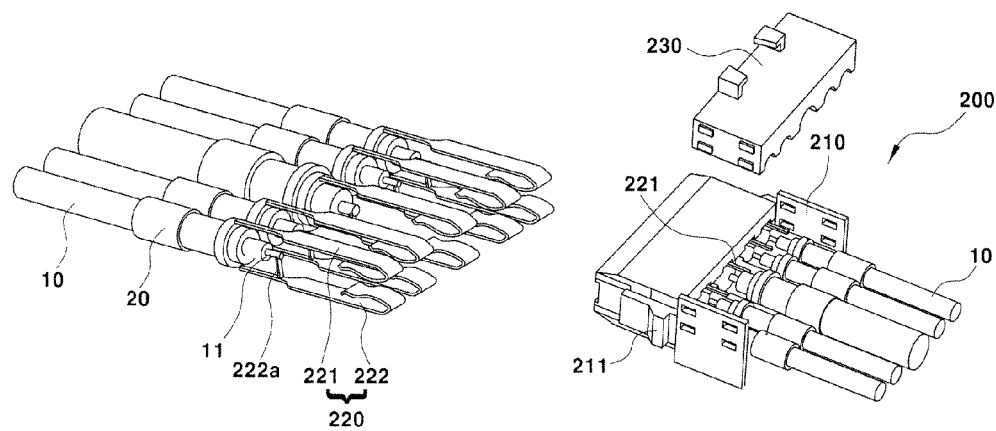

As shown in FIGS. 4 and 5, in order to implement a multi-connection structure together with the male connector 100, the female connector 200 may include a female housing 210. A female terminal module 220 may be integrally disposed inside the female housing 210, and a female pressurizing cover 230 opens/closes a rear end of the top surface of the female housing 210.

The female housing 210 may include a stopping protrusion 211 formed at a front end portion of left and right side surfaces thereof to couple with the female housing 110, and may include a support structure (not shown) for seating the plurality of cables 10 therein.

The support structure may be changed according to the exterior of the cable 10 that is inserted into the female housing 210 to be assembled, and may be formed to have a structure for stably supporting each cable 10.

The cables 10 may be inserted into the female housing 210 while being assembled with the clamp shells 20.

The female housing 210 may be formed such that the front end portion of the female housing 210 can be inserted into the male housing 110. When the front end portion of the female housing 210 is inserted into the male housing 110, the stopping protrusion 211 may be coupled to the assembly aperture 111 of the male housing 110, forming a locking structure that prevents a coupling release between the male connector 100 and female connector 200.

The female terminal module 220 may include a plurality of female signal pins 221 and a plurality of female ground pins 222. As shown in FIG. 4, the female terminal module 220 may be fixedly attached to an inner wall of the front end portion of the female housing 210. In this case, the female signal pins 221 may be attached to an inner upper surface of the female housing 210 at a certain interval, and the female ground pins 222 may be attached to an inner lower surface of the female housing 210 at a certain interval.

As shown in FIG. 5, each of the female ground pins 222 may include a connection pin 222a for the contact with the cable terminal 11, and the connection pin 222a may allow the cables 10 to be seated in the female housing 210 and simultaneously contact the cable terminal 11 to enable the signal transmission.

The female signal pins 221 and the female ground pins 222 may be formed of a material that can transmit a signal when contacting a cable terminal. For example, the female signal pins 211 and the female ground pins 222 may be formed of a strip conductor used in the strip line. The female signal pins 221 and the female ground pins 222 may form a pair, enabling individual signal transmission using the female ground pins 222 as the ground.

The female pressurizing cover 230 may be fixedly disposed at a rear end of the top surface of the female housing 210 to support the plurality of cables 10 that are seated in the female housing 210 to be assembled. The female pressurizing cover 230 may fixedly support the cables 10 by downwardly pressurizing the cables 10, a lower side of which is supported by the internal structure of the female housing 210. Thus, the contact state between the cable terminal 11 and the connection pin 222a of the female ground pins 222 may be stably maintained.

The female signal pins 221 and the female ground pins 222 may be formed to have a bent shape having elasticity at one end thereof. Thus, when the female connector 200 and the male connector 100 are coupled to each other, connection efficiency between the female signal pins 221 of the female connector 200 and the male signal pins 122 of the male connector 100 and between the female ground pins 222 of the female connector 200 and the male ground pins 123 of the male connector 100 can be secured, and thus, the operational reliability can be improved.

Figure 6:
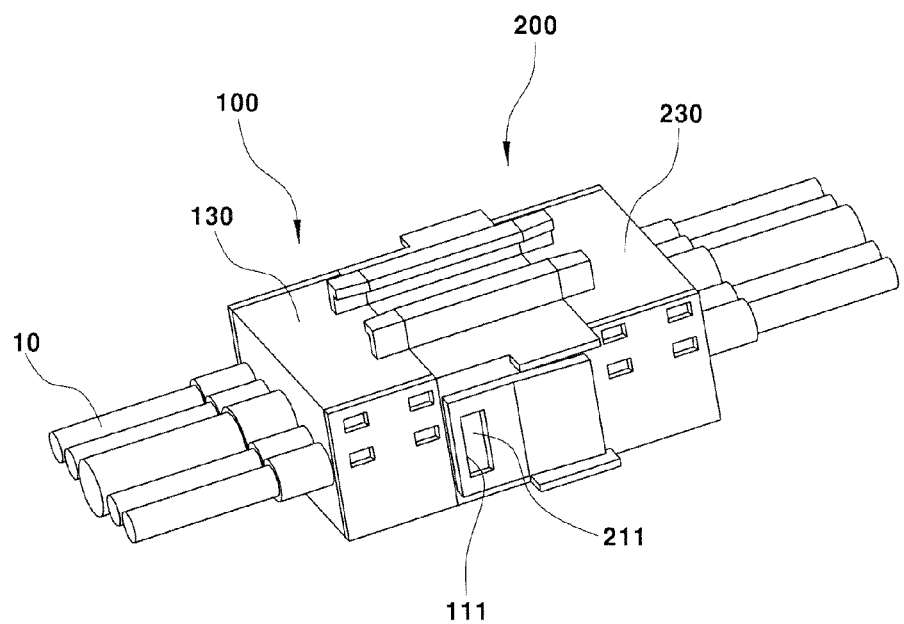
FIG. 6 is a perspective view illustrating an RF connector assembly according to an embodiment of the present disclosure.
Figure 7:
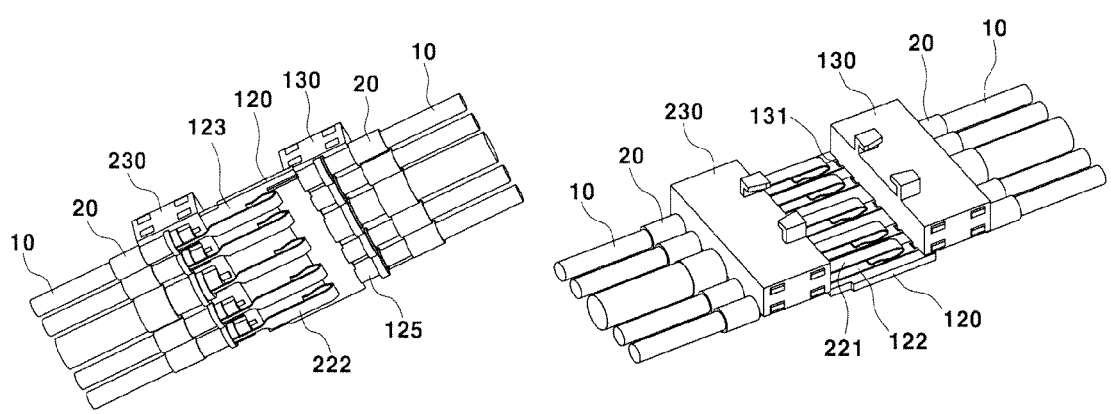
FIG. 7 is a view illustrating a connection structure for the signal transmission of an RF connector assembly according to an embodiment of the present disclosure.

FIG. 6 illustrates a coupling state between the male connector and the female connector according to the embodiment of the present disclosure, and FIG. 7 illustrates a one-to-one contact state between cables assembled to the male connector and the female connector.

As shown in FIG. 6, the male connector 100 and the female connector 200 are coupled and the cables 10 are assembled. As shown in FIG. 7, the male signal pins 122 of the male connector 100 and the female signal pins 221 of the female connector 200 and between the male ground pins 123 of the male connector 100 and the female ground pins 222 of the female connector 200 are in contact, thus enabling multi-connections in which the cables 10 assembled to the male connector 100 and the cables 10 assembled to the female connector 200 are connected to each other by one-to-one.

The RF connector assembly according to the embodiment of the present disclosure may receive antenna signals through the cables assembled to the female connector and then transmit the signals to the AV system through the cables assembled to the male connector.

The RF connector assembly for a vehicle according to the embodiment of the present disclosure has the following advantages:

1. Since the RF connector assembly includes a simplified multi-connecting structure that can be mounted by a one-click method, the assembly time can be shortened, and the number of connectors can be reduced, thereby achieving cost saving.

2. Since the RF connector assembly includes a simplified multi-connecting structure, the stiffness of a vehicle can be increased by connecting a plurality of cables each other. Accordingly, the quality improvement can be achieved.

3. Since the RF connector assembly includes a simplified multi-connecting structure with a relatively small size, in-vehicle space efficiency can be improved.

4. Since the RF connector assembly includes a simplified multi-connecting structure that simplifies parts thereof, the process defect can be minimized.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A radio frequency connector assembly for a vehicle, comprising:
   a male connector and a female connector to which a plurality of cables are assembled, respectively,
   wherein a female housing of the female connector is inserted into a male housing of the male connector to be coupled to each other, and simultaneously, a female terminal module provided in the female connector for a signal transmission of the cables and a male terminal block provided in the male connector for the signal transmission of the cables contact each other to transmit signals,
   wherein the male connector comprises: a board; and a male pressurizing cover fixedly assembled to a rear end of a top surface of the male housing to fixedly support the cables assembled in the male housing,
   wherein the male pressurizing cover comprises a plurality of pressurizing protrusions formed thereunder, and the pressurizing protrusions allow a cable terminal assembled in the male housing to stably contact each of a plurality of male signal pins thereunder,
   wherein the female connector comprises: a female pressurizing cover fixedly assembled to a rear end of a top surface of the female housing to fixedly support the cables assembled in the female housing,
   wherein the female terminal module comprises a plurality of female signal pins integrally attached to one surface of the female housing and a plurality of female ground pins integrally attached to another surface of the female housing, and
   wherein each of the female ground pins of the female terminal module is provided with a connection pin to connect with the cable terminal, and the connection pin is disposed in the female housing to simultaneously contact the cable terminal when assembling.

2. The radio frequency connector assembly of claim 1, wherein the male terminal block is integrally disposed at an internal front end of the male housing and comprises the plurality of male signal pins disposed on one surface of the board at a certain interval and a plurality of male ground pins disposed on another of the board.

3. The radio frequency connector assembly of claim 1, wherein the male housing has an assembly aperture in left and right side surfaces thereof, and the female housing comprises a stopping protrusion disposed on left and right side surfaces thereof and coupled to the assembly aperture, such that the male connector is fixedly coupled to the female connector when the female housing is inserted into the male housing.

4. The radio frequency connector assembly of claim 2, wherein the male terminal block has connection grooves formed at a rear side of each of the plurality of male signal pins to connect with the cable terminal.

5. The radio frequency connector assembly of claim 1, wherein each of the female signal pins and the female ground pins of the female terminal module have a bent shape having elasticity at one end of the female terminal module, thus securing a connection efficiency with the male terminal block.

\* \* \* \* \*